US005718319A

United States Patent [19]

Gih

[11] Patent Number: 5,718,319

[45] Date of Patent: Feb. 17, 1998

[54] ESCALATOR AND MOVING WALK COMB SAFETY DEVICE

[76] Inventor: Gir Gih, 32 Holland Rd., Parsippany, N.J. 07054

[21] Appl. No.: 601,189

[22] Filed: Feb. 14, 1996

[51] Int. Cl.[6] .......... B65G 43/00

[52] U.S. Cl. .......... 198/323; 198/325

[58] Field of Search .......... 198/323, 325

[56] References Cited

U.S. PATENT DOCUMENTS 3,233,717 2/1966 Jin et al. .......... 198/323

FOREIGN PATENT DOCUMENTS 374169 11/1959 Germany .......... 198/323

1269315 4/1964 Germany .......... 198/323

2135864 7/1971 Germany .......... 198/323

404153195 5/1992 Japan .......... 198/325

406144766A 5/1994 Japan .......... 198/325

*Primary Examiner*—James R. Bidwell

*Assistant Examiner*—Khoi H. Tran

*Attorney, Agent, or Firm*—Richard T. Laughlin, Esq.; Graham, Curtin & Sheridan

[57] ABSTRACT

A safety device for use in an escalator or moving walk for detecting stuck objects. A fine high-strength flexible wire is positioned through all the comb teeth and the skirts. A stretching of the wire triggers an electrical switch which in turn causes a relay to stop operation of the escalator or moving walk. Once this device is activated, only manual resetting will again activate the movement of the escalator.

10 Claims, 4 Drawing Sheets

ESCALATOR AND MOVING WALK COMB SAFETY DEVICE

FIELD OF THE INVENTION

This invention relates to a safety device for use on a passenger conveyor, such as an escalator or moving sidewalk, to prevent personal injury and damage to equipment and, more particularly, to a safety device located at the combplate for automatically stopping the passenger conveyor as a result of the presence of foreign material.

BACKGROUND OF THE INVENTION

A passenger conveyor, such as an escalator or moving sidewalk, typically includes a number of passenger platforms, such as treads of steps, which are driven in an endless path between horizontally-spaced landings. Commonly, a combplate is mounted at the landing to permit passengers to easily step on or off the conveyor. The landings at each end of the escalator or moving walk include combplates which have plurality of teeth which mesh with the longitudinal grooves in the steps.

The most dangerous part of a moving sidewalk or escalator is at such landings when the steps or sidewalk pass into a stationary piece commonly referred to as a combplate. During the course of operation of a passenger conveyor, it is possible for foreign objects, such as the pointed heel of a shoe, miscellaneous refuse, or, more dangerously, a body part of a passenger, to become lodged between a step or the conveyor belt and the combplate. Trapped foreign objects are then forced against the combplate by the powerful mechanism which drives the conveyor. If the mechanism is not immediately stopped, substantial injury can occur to an individual or the mechanism can be severely damaged. For this reason, various devices have been suggested for acting as a trip mechanism for shutting off the power to an escalator or moving sidewalk. Typical of such devices are those shown in the following United States patents: Johnson U.S. Pat. No. 3,684,257 issued Aug. 29, 1972; Johnson U.S. Pat. No. 3,913,723 issued Oct. 21, 1975; Nurnberg U.S. Pat. No. 5,255,771 issued Oct. 26, 1993; and Loshbough U.S. Pat. No. 3,580,376 issued May 25, 1971.

The combplate is understandably the source of many problems since it provides the interface between the moving steps or treads and the stationary landing. Most of the prior safety devices use mechanical actuators to detect the movement of the combplate, or use photo detectors to detect the presence of foreign objects which pass beneath the combplate. One approach to solving the safety problem has been to construct a combplate which moves when an obstruction is present. In such a device, rather than resisting the force generated by the obstruction to the motion of the conveyor, the movable combplate is displaced or raised and closes a circuit which deenergizes the conveyor. Such combplates, although effective, have a disadvantage in that various deposits can accumulate between the combplate and the contact causing an unnecessary power shut off and disruption of the conveyor. Further, people jumping on the landing area may cause the shutting off and disruption of the conveyor.

The use of mechanical actuators which directly detect the movements of the combplate can be prone to a number of additional operational problems which may render it inoperable. For example, the foreign object passing beneath the combplate may not exert enough force on the device to cause the required movement to occur, or it may not occur with sufficient speed to prevent injury or damage to the construction. This can occur, for example, when a scarf or other light fabric is run beneath the combplate. Another problem with moving combplates as safety devices is that they cannot work if some weight is on the combplate such as when someone is standing on the part that requires movement to shut off the system. Thus, if a person who has an article of clothing caught beneath a tread comb, or someone trying to help that person, is standing on the comb or on the part of the landing that must move to trigger the safety device, the device becomes inoperable. The same situation may happen to those devices to detect the foreign object caught between the stationary skirts and the combplate or the moving step at the landing area.

The safety device which uses a photo detector to detect the foreign objects which pass beneath the comb can cause some unnecessary shutdown of the escalator or moving walk. For example, if the foreign object is a piece of paper, it would trigger the photo detector even if the photo detector has built in a time delay to respond. There is no way to determine how long the paper will stay and block the light beam. Further, dirt may accumulate in the light beam channel which will cause an unnecessary stop. Another problem is that light fabric, such as shoelace, which can easily get into the groove of the step, may not be detected by the photo detector or it may take a long time to detect. After detecting the shoelace, the delay built into the system can have serious consequences.

SUMMARY OF THE INVENTION

An object of the invention is to provide a new and improved safety device for the combplate of a passenger conveyor which solves the above specified problems. Another object of the invention is to provide such a device which acts rapidly, thereby preventing any injury to the users of the conveyor. A further object of the invention is to provide such a device which is resistant to false shut downs. A still further object of the invention is to provide an improved multiple function safety device for both escalators and moving walks. Other objects and the advantages of the invention will occur to one skilled in the art from the following detailed descriptions.

In accordance with the invention, a safety device is provided by utilizing a fine high-strength flexible wire which passes through a continuous hole provided in the comb teeth. This hole is drilled at the front portion of the teeth and at a point closely adjacent to the bottom line of the combplate. One end of the wire is affixed to the combplate. Movement of the combplate will cause the wire to be extended. The wire extends from the side of the combplate through a slot in a side skirt to the other side of the skirt and then back through a second slot to be affixed to the side of the combplate. Slots are used to allow free movement of the wire. The opposite end of the wire extends through a slot in the opposite side skirt to be affixed to an actuator switch affixed to the outside of the skirt. The upper ends of those slots are at a position a little bit higher than the top of the step. The end of the wire is affixed to the actuator by means of an adjustment knob which in turn is affixed to the driving arm of the actuator. When the adjustment knob is turned, it exerts tension on the wire.

The three slots in the skirts are provided with lubricated bushings in the skirts to reduce the friction between the slots and the wire. Affixed to the opposite side of the driving arm is a spring or other tensioning device to provide a tension on the wire which is just enough to keep the wire straight between any two adjacent teeth on the combplate and between the skirt and the teeth. Any direction of movement on the wire will transform to linear movement on the driving arm of the actuator. As long as a foreign object is caught by an escalator or moving walk at the landing area, the wire will pull the driving arm. When the movement of the driving arm exceeds the pre-set value, the actuator will trigger a relay to stop the motor operating the escalator or moving walk. When the combplate is moved toward the actuator, the wire will in turn be loosened and the, spring will cause the arm to move in the opposite direction, which, when the pre-set value of the actuator is exceeded, will trigger the relay to stop the operation of the escalator or the moving walk. When the combplate is moved away from the actuator, the wire will be under tension and pull the driving arm. If the amount of movement exceeds the pre-set value, the actuator will trigger the relay to stop the operation of the escalator or the moving walk. If the wire is broken, the spring will also pull the driving arm and the actuator will trigger the relay to stop the escalator or moving walk. Any fabric that is caught by the escalator or moving walk at the landing area will either push the wire or the tension on the fabric will push the wire no matter where the person stands and the actuator will trigger the delay to stop the operation of the escalator or moving walk. If paper on the step will be swept out by the wire even if it goes beneath the combplate, it will not trigger the actuator. If some of the steps are loose or not at the proper position, it will push the comb teeth and cause the combplate to move or break some teeth. This also causes the wire to pull or loosen the driving arm of the actuator to trigger the relay to stop the escalator or moving sidewalk. The invention will be more fully understood by the following detailed description when read in connection with the drawings.

DETAILED DESCRIPTION OF TEE PREFERRED EMBODIMENT

Figure 1:
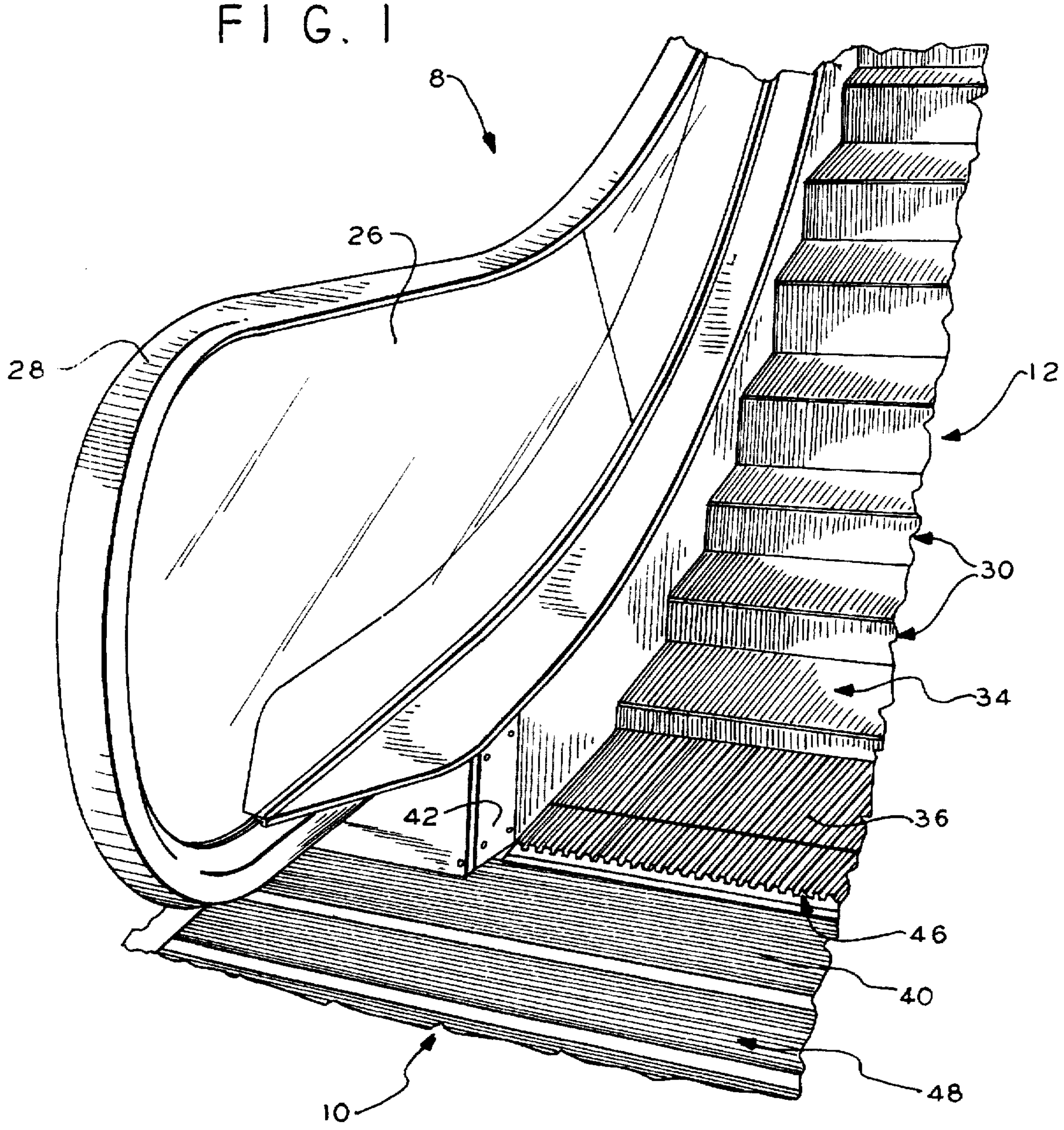
FIG. 1 is a fragmented perspective view of the landing portion of an escalator showing the handrail, threads, steps and landing plate with comb.
Figure 2:
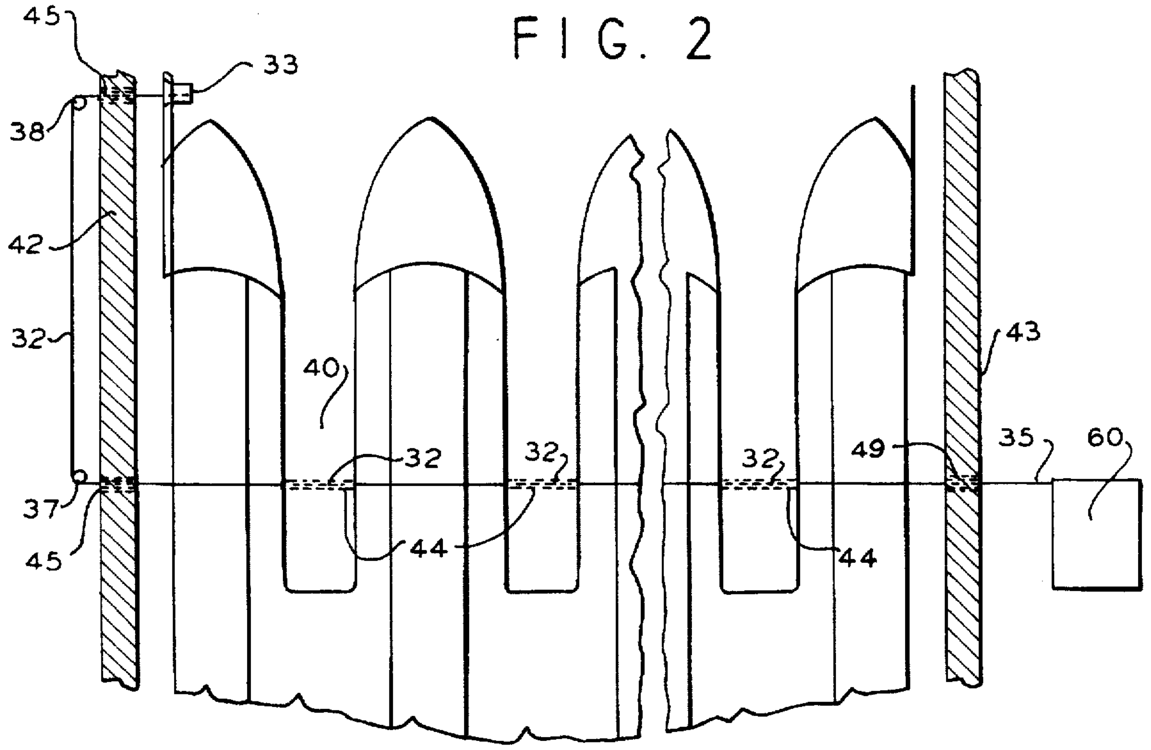
FIG. 2 is a fragmented plan view of the escalator landing area of FIG. 1.
Figure 3:
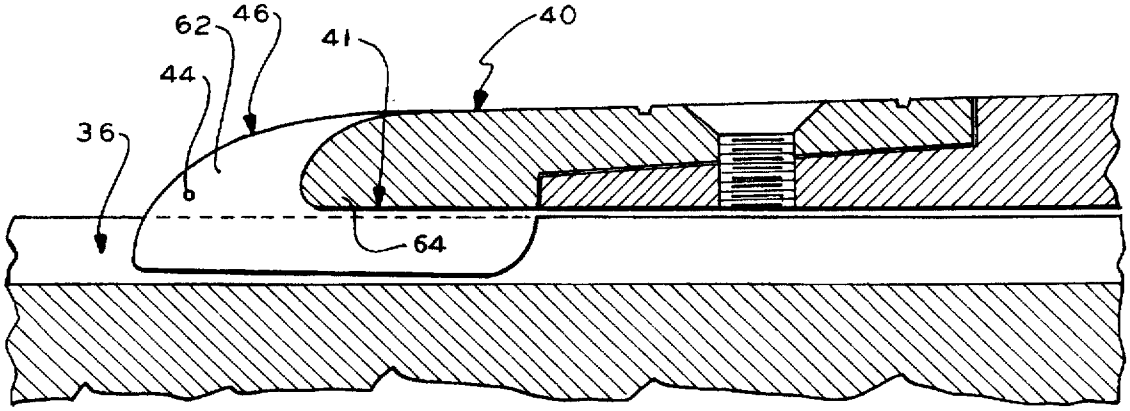
FIG. 3 is a vertical sectional view through the comb plate and treadway taken perpendicular to the wire path.
Figure 7:
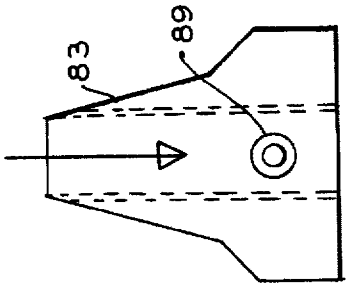
FIG. 7 shows a moveable clamp plate used on each side of the actuator shown in FIG. 4.
Figure 6:
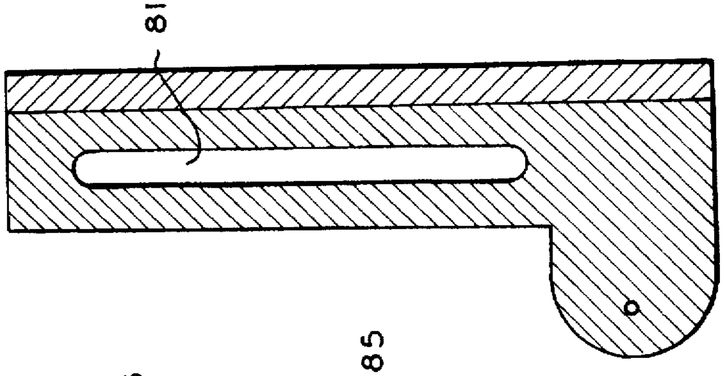
FIG. 6 is a sectional view at section 6—6 of FIG. 4.

Referring to the drawings, there is shown in FIG. 1 an escalator generally indicated at 8, with a exit landing area generally indicated at 10, moving handrail 28 and side section 26. Although only one handrail and side section is shown in the Figure, handrails and side sections are usually used on both sides of the moving conveyance. The escalator shown has articulated treads mounted on treadway generally indicated at 12 having a number of tread plates 34 and risers 30 depending upon the height of the escalator. The treads plates 34 have longitudinally spaced grooves 36 on their top surfaces which pass under a combplate 40 which precedes the landing plate 48. On each side of the combplate is a vertical skirt 42, 43. The combplate 40 is formed with a plurality of teeth 46 which project into the tread grooves 36 and serve to prevent debris deposited in the grooves from passing beneath the combplate 40.

Referring specifically to FIGS. 2, 3, 4, 5, 6 and 7, a wire 32 is shown with one end 33 fixed on the combplate 40 and the other end goes through a slot ground two small round studs or guides 38, 37 which guide the wire 32 through slots 45 in the side skirt and then through a series of holes 44 in each of the comb teeth 46 extending in a generally horizontal line and then through hole 49 in the opposite skirt 43. The opposite end 35 of the wire 32 extends to an actuator container 60. The end 35 of the wire is connected to an adjustment knob 58 on the actuator box 60 to allow tightening of the wire 32. The adjustment knob 58 is connected to the male portion 73 of a screw arrangement 59. The opposite end of the male screw portion is affixed to the lower portion 71 of the pivoting arm 68. Turning the knob will release or place tension on the wire 32 so that it can be adjusted to the desired position. The entire screw adjustment device 59 passes through a bearing 61 in the side of actuator box 60 to allow the whole screw adjustment device to freely slide depending on the movement of the wire 32.

The holes 44 pass through the front edge 62 of the combplate and above the bottom 64 of combplate. The holes 44 are just large enough to let the wire 32 easily go through. If a wire of 1/16 inch diameter is utilized, the hole would only be slightly larger to allow free passage without any room for accumulation of debris. The wire passes between adjacent teeth and through a slot 49 between the skirt and the outer teeth. This allows the wire to be moved in any direction. Any foreign material, such as fabric, caught between the comb and step or the skirt and step will push some section of the wire and it will transform to linear movement that will cause actuator 60 to respond if the movement exceeds the pre-set value and switches 70 or 80 will be opened and stop the operation of the escalator or moving walk.

Figure 4:
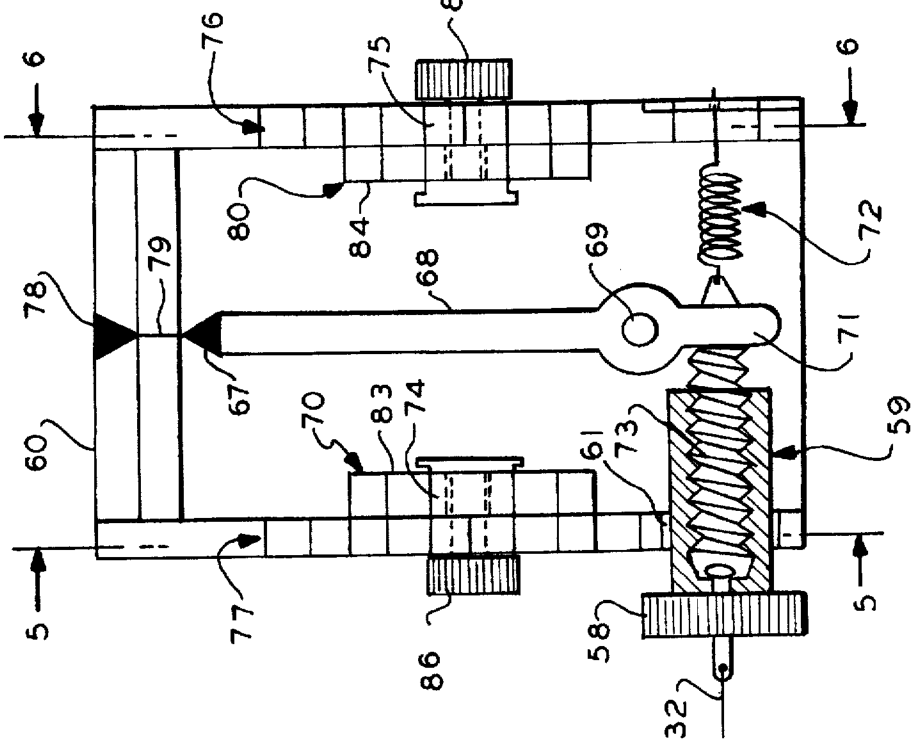
FIG. 4 is a plan view of the exemplary actuator.
Figure 5:
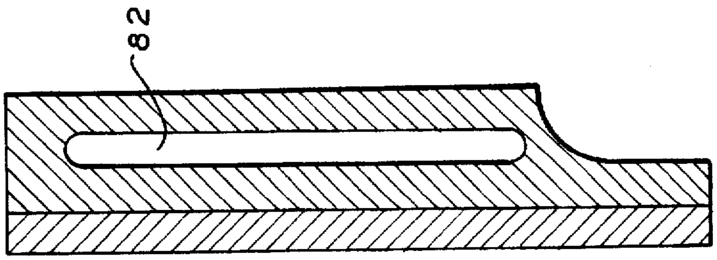
FIG. 5 is a sectional view at section 5—5 of FIG. 4.

Referring to FIG. 4, the two contact switches 70 and 80 on are on either side of pivoting arm 68. When the arm 68 pivots in one direction it closes switch 70, and when it pivots in the opposite direction it closes switch 80. Switch 70 is used to detect wire slack condition, and switch 80 is used to detect wire stretch. The switches are identical and can be adjusted along the sliding slots 81, 82 and be secured to the selected scale by tightening the screws 74, 75 with adjusting knobs 85, 86. The scale markings 76, 77 will tell how many times the linear movement of the wire will be amplified. The alignment indicator 78 will tell the arm 68 at center position 79 between the two switches 70 and 80. It also tells that the wire has right tension providing that the spring and every section of the wire are straight. For example, the distance between the arm and the two switches 70 or 80 is 5 mm when the arm at the indicator position sets the switches at scale marking 2½, when the linear movement of the wire exceeds 2 mm then one of the two switches will be opened to energize the relay 50 and switch 51 and shuts off the motor which moves the escalator. If the wire is broken, the spring will pull the arm to open switch 70.

Figure 8:
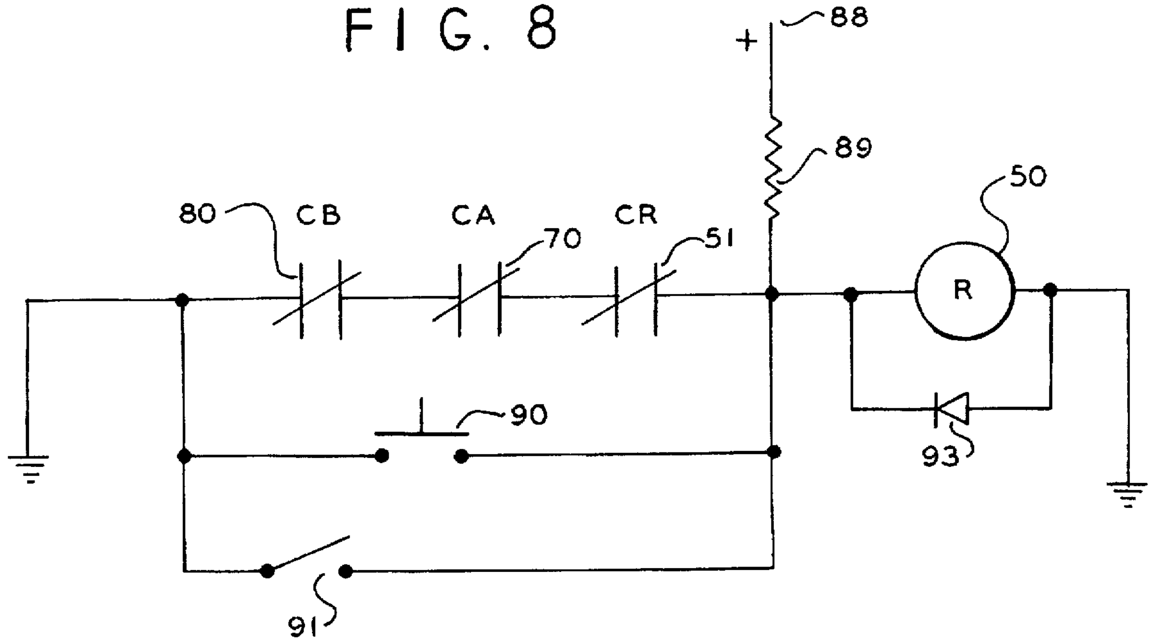
FIG. 8 shows a circuit for controlling the switches, relay, manual reset and manual override.

Referring to FIG. 8, CA indicates the normal closed contact of switch 70. CB is the normal closed contact of switch 80. CR is the normal closed contact of relay 50. Closing either one of the contact CA or CB opens the relay 50 and will be energized, then the CR contact opens. A diode is provided in the relay circuit to eliminate noise. Power is provided from 88 which flows through a resister. The other contact of relay 50 will trigger the brake alarm and shut down motor to stop the operation of the escalator or moving walk. Once the relay is energized, it will lock in the detected problems until those problems are resolved and a reset button 90 is pushed to open the circuit to allow current to flow to the motor so the escalator or moving sidewalk can operate again. The manual override switch 91 can override the detected problems or disable the safety device to let the escalator or moving walk operate.

This invention can be used at both landings of an escalator and a moving sidewalk. This safety device can be readily installed in the existing escalator or moving walk merely by drilling holes through the comb teeth of the existing combplate. It is necessary to align the holes on the comb teeth which are not perfectly aligned. The skirt at the landing area can be modified or replaced with a new one which has slots on it. If you put a key access window on the skirt to make it even and easier to adjust, and install and examine the actuator, the two rounds studs and the trigger circuit, this invention will be very accurate, responsive and very easy to adjust, examine and maintain.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In an escalator or moving sidewalk having a moving section driven by a motor, a stationary combplate having an upper surface and a lower surface and vertical side panels on either side of the combplate, the improvement which comprises slots in the side extending completely through each side panel, a fine high-strength flexible wire passing through the combplate adjacent to its lower surface and extending through the slots in the side panels, one end of the wire passing through a third slot on one of the side panels and affixed to the combplate, the opposite end of the wire being affixed to an actuator for shutting off the motor operating the escalator when the wire is stretched or elongated.

2. In an escalator or moving sidewalk having a load supporting surface with longitudinal grooves and ribs therein for transporting passengers between adjacent opposite ends thereof, the combplate having a plurality of comb teeth adapted to extend longitudinally into the longitudinal grooves in the load supporting surface and adjacent landing surface to assist passengers in making a smooth transition between surfaces, mounting means for mounting the combplate adjacent to the load supporting surface, an electric motor for moving the load supporting surface, the combplate having an upper surface and a lower surface, and vertical side panels on either side of the combplate, the improvement which comprises providing narrow slots in the side panels extending completely through each side panel, a continuous horizontal hole in the teeth of the combplate adjacent to its lower surface, a fine high-strength flexible wire passing through the hole with each end of the wire extending through one of the slots in the side panels, one end of the wire passing out of the slot around a stud affixed on the outer surface of the side panel along the panel around a second round stud and through a third slot on the side panel and the end of the wire affixed to the combplate, the opposite end of the wire passing through a slot in the opposite panel and having its end affixed to an actuator means which shuts off the motor operating the escalator when the wire is stretched or elongated.

3. The escalator or moving sidewalk according to claim 2 wherein the actuator comprises a pivoted arm, contact switches on either side of the arm which will be actuated when the pivoted arm contacts the switch, the opposite end of the wire connected to the pivoted arm, a spring for maintaining the pivoting arm in a stationary position whereby movement of the wire in either direction will cause contact of the arm with one of the switches.

4. In an escalator or moving sidewalk according to claim 2, having slippery bushings in the slots on the side panels to reduce the friction between the slot and the wire.

5. In an escalator or moving sidewalk according to claim 2, wherein a spring provides a tension on the wire which is just enough to keep the wire straight between any two adjacent teeth and between the side panel and the teeth so that when the combplate is moved the wire will pull it if the movement exceeds the pre-set value of the actuator and will trigger a relay to stop the operation of the escalator or moving walk.

6. In an escalator or moving sidewalk according to claim 2, having slippery bushings in the slots on the skirts to reduce the friction between the slot and the wire and on the opposite of the driving arm a light spring to provide a tension on the wire which is just enough to keep the wire straight between any two adjacent teeth and between the skirt and the teeth so that when the combplate is moved the wire will pull it if the movement exceeds the pre-set value of the actuator and will trigger the relay to stop the operation of the escalator and when the combplate is moved away from the actuator, the wire will pull the driving arm if the movement exceeds the pre-set value and the actuator will trigger the relay to stop the operation of the escalator or the moving walk.

7. In an escalator or moving sidewalk according to claim 2, wherein the opposite end of the wire is affixed to the actuator by adjusting means whereby pivoting lever can be centered.

8. In an escalator or moving sidewalk according to claim 7, wherein the pivoting arm has a lower section below the pivot point and an upper section above the pivot point, the adjusting means being affixed to the lower section.

9. In an escalator or moving sidewalk according to claim 8, further comprising contact switches which are adjustable horizontally to allow selection of delay time for activation by the movement of the upper section of the pivoting arm.

10. In an escalator or moving sidewalk according to claim 9, containing manual reset means for turning on the motor.

* * * * *